(12) United States Patent
Kim

(10) Patent No.: US 7,744,323 B2
(45) Date of Patent: Jun. 29, 2010

(54) RETRACTABLE NAIL DEVICE

(76) Inventor: Steve Songrok Kim, 6334 Demme Pl., Springfield, VA (US) 22150

( * ) Notice: Subject to any disclaimer, the term of this patent is extended or adjusted under 35 U.S.C. 154(b) by 182 days.

(21) Appl. No.: 11/727,293

(22) Filed: Mar. 26, 2007

(65) Prior Publication Data

US 2007/0177961 A1     Aug. 2, 2007

Related U.S. Application Data

(63) Continuation-in-part of application No. 11/246,312, filed on Oct. 11, 2005.

(51) Int. Cl.
*F16B 15/00* (2006.01)

(52) U.S. Cl. .............. 411/451.1; 411/2; 411/5; 411/451.3; 411/451.4; 411/473; 411/999

(58) Field of Classification Search .......... 411/451.1, 411/451.3, 451.4, 457, 473, 488, 499, 914, 411/923, 2, 5, 999
See application file for complete search history.

(56) References Cited

U.S. PATENT DOCUMENTS

| | | | | |
|---|---|---|---|---|
| 2,182 | A * | 7/1841 | Ballard | 411/452 |
| 333,889 | A * | 1/1886 | Perry | 411/451.4 |
| 405,972 | A * | 6/1889 | Taylor | 411/481 |
| 581,074 | A * | 4/1897 | King | 411/451.3 |
| 915,586 | A * | 3/1909 | Garrity | 411/451.3 |
| 963,027 | A * | 6/1910 | Limberg et al. | 411/456 |
| 1,077,583 | A * | 11/1913 | Baxter | 411/451.3 |
| 2,001,869 | A * | 5/1935 | Deniston, Jr. | 470/7 |
| 2,807,854 | A * | 10/1957 | Mellen et al. | 411/554 |
| 2,868,057 | A * | 1/1959 | Anstett | 411/451.3 |
| 3,061,455 | A * | 10/1962 | Anthony | 411/258 |
| 3,458,896 | A * | 8/1969 | Zetterlund et al. | 425/509 |
| 3,498,352 | A * | 3/1970 | Duffy | 411/302 |
| 3,568,746 | A * | 3/1971 | Faroni et al. | 411/302 |
| 3,861,526 | A * | 1/1975 | Leistner | 206/343 |
| 4,011,785 | A * | 3/1977 | Schrepferman | 411/545 |
| 4,116,106 | A * | 9/1978 | Barbour | 411/38 |
| 4,836,730 | A * | 6/1989 | Jesson et al. | 411/387.6 |
| 6,139,238 | A * | 10/2000 | Anstett | 411/451.1 |
| 2004/0208726 | A1 * | 10/2004 | Bohme et al. | 411/411 |

* cited by examiner

*Primary Examiner*—Victor Batson
*Assistant Examiner*—Roberta Delisle
(74) *Attorney, Agent, or Firm*—Wonki Park

(57) ABSTRACT

A retractable nail includes a head portion having a striking surface and a slot through the striking face. The slot is configured for receiving a removal tool. The nail includes a piercing part the head portion and the piercing part. A longitudinal main body is positioned between the longitudinal main body includes a front side, rear side and two lateral sides. The front and rear sides include respective front and rear helical thread segments formed along a longitudinal length of the main body. The threads are filled or covered with a plastic material, epoxy, glue, composite or the like to prevent damage to the helically threads when the device is hammered or bored with a pneumatically or electrically powered nail gun into a solid material.

7 Claims, 3 Drawing Sheets

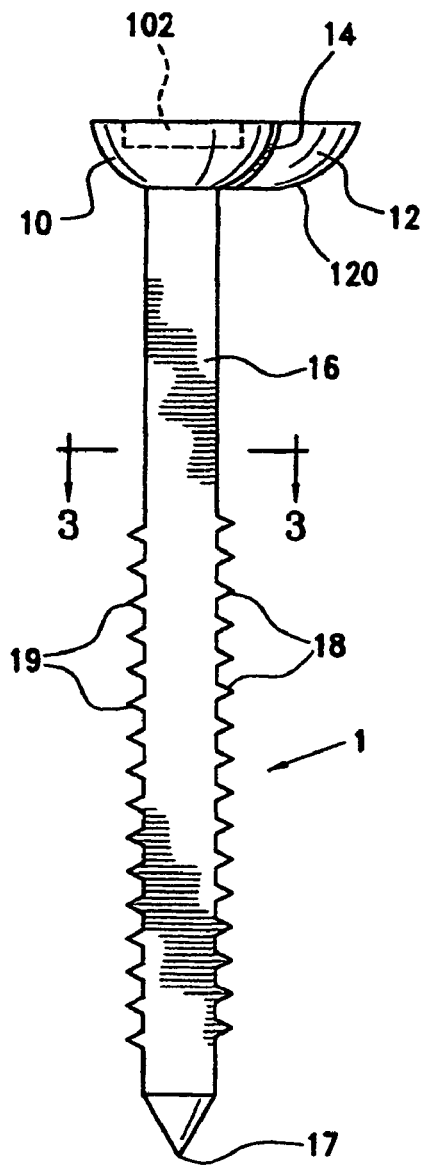
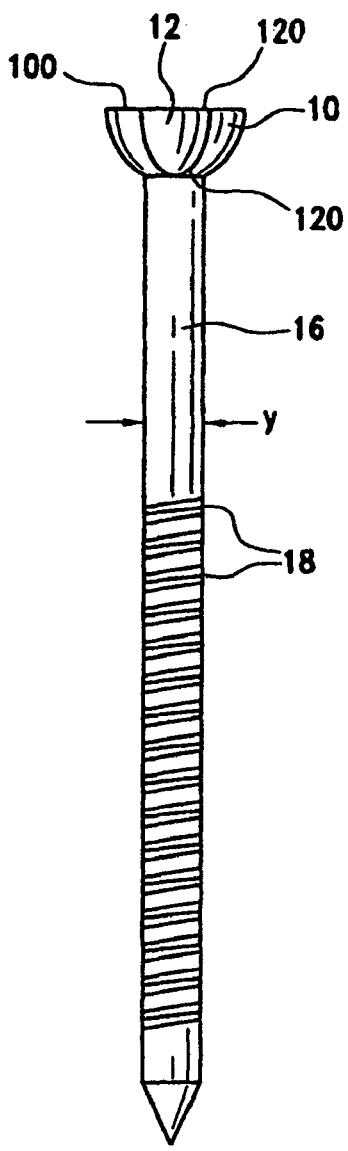
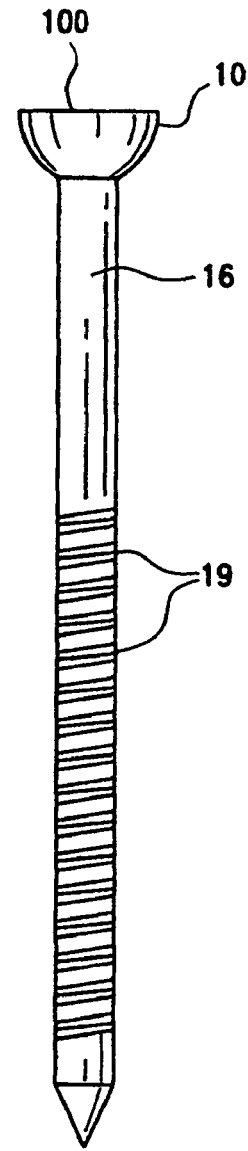
FIG. 1     FIG. 4     FIG. 5
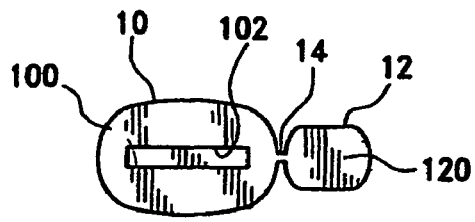
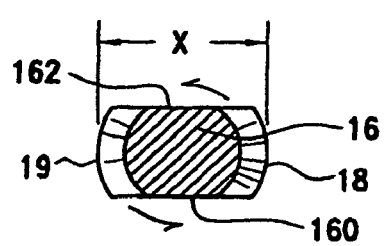
FIG. 2     FIG. 3

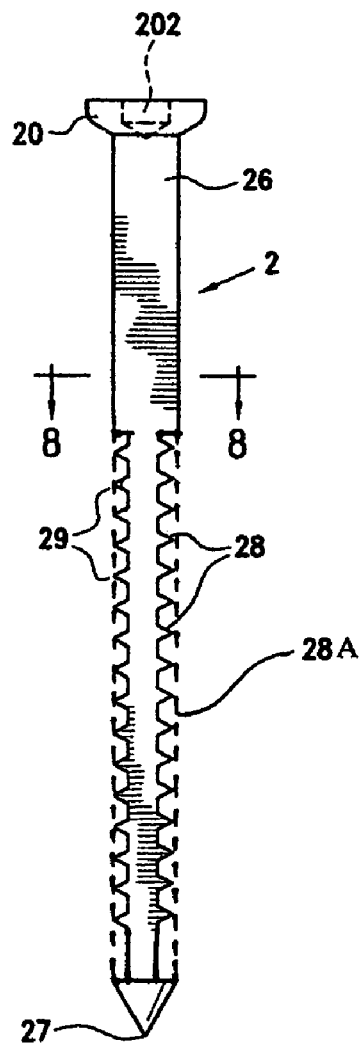
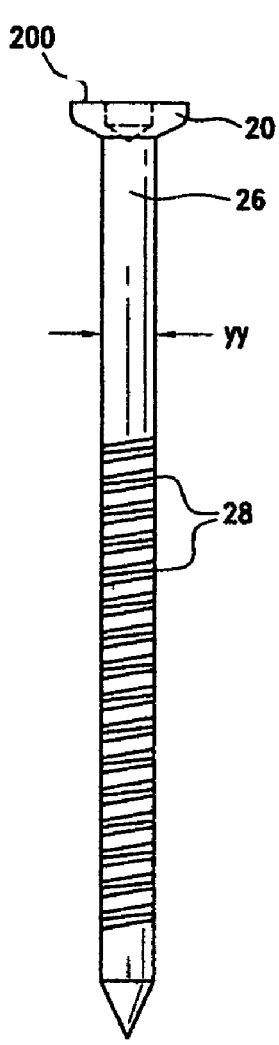
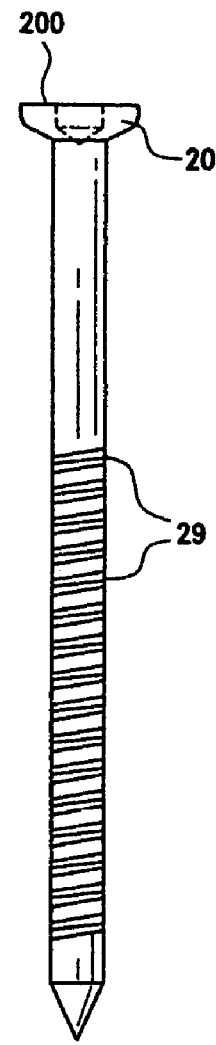
FIG. 6　　　FIG. 9　　　FIG. 10
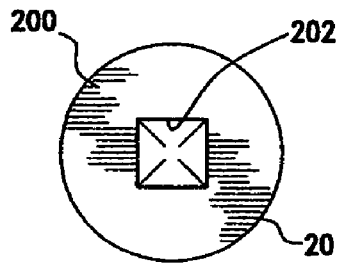
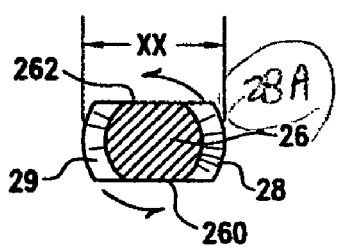
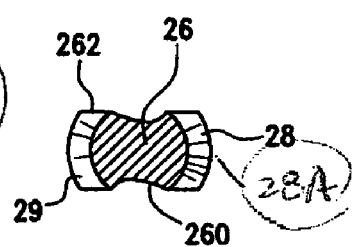
FIG. 7　　　FIG. 8　　　FIG. 8A

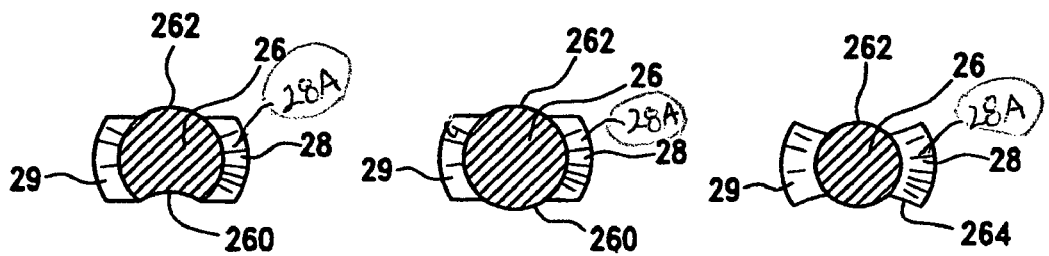
FIG. 8B   FIG. 8C   FIG. 8D
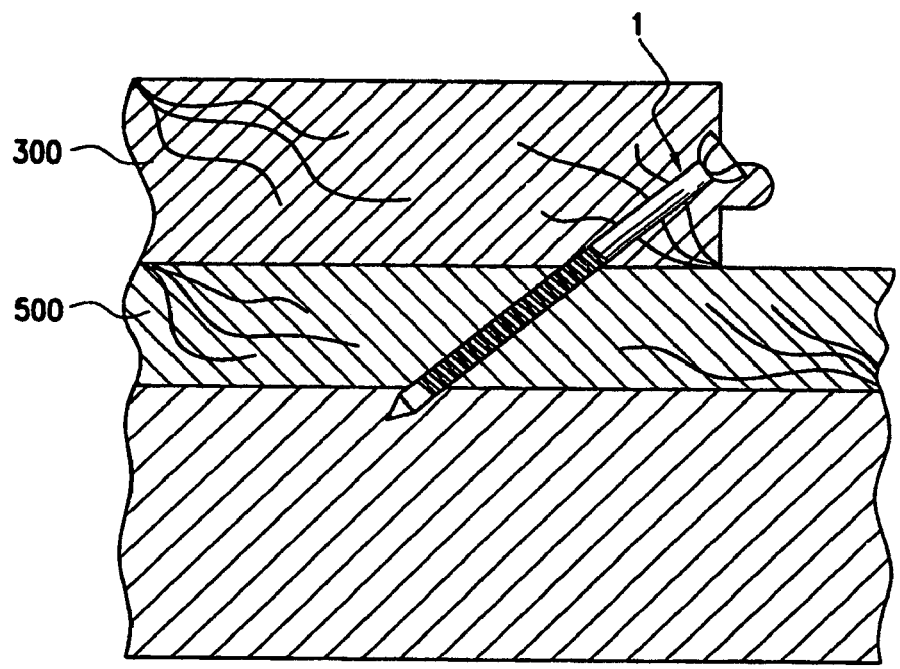
FIG. 11
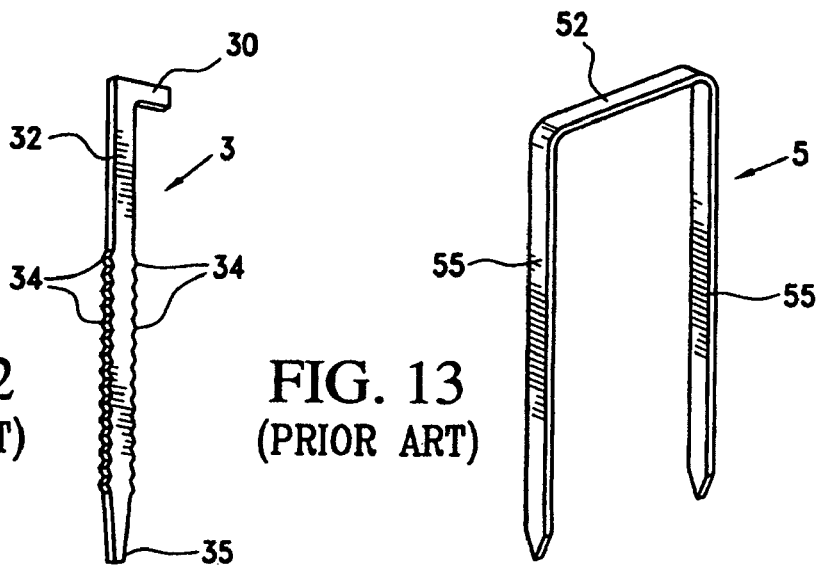
FIG. 12
(PRIOR ART)
FIG. 13
(PRIOR ART)

RETRACTABLE NAIL DEVICE

The present Application for Patent is a Continuation in Part/Continuation and claims priority to patent application Ser. No. 11/246,312 entitled "RETRACTABLE NAIL DEVICE" filed Oct. 11, 2005.

BACKGROUND OF THE INVENTION

1. Field of the Invention

The present invention relates to a retractable nail device, more particularly to an attachment device to any solid, fibrous or cellular materials or the like, including wood, metal, plastic or composite materials, which can be retracted without destroying the material to which the retractable nail device is inserted into. In particular, the helically threaded portions of the device are covered or filled with a plastic material, epoxy, glue, composite or the like to prevent damage to the helically threaded portions of the device when the device is hammered or bored with a pneumatically or electrically powered nail to any solid, fibrous or cellular materials or the like, including wood, metal, plastic or composite materials.

2. Description of the Related Art

The wood floor nail 3 of FIG. 12 and the wood floor staple 13 illustrate prior art attachment devices that are used to attach wood floor boards to the sub floor, in the manner similar to the illustration of FIG. 11. The wood floor nail 3 has a main head 30 and a main body 32, lateral extensions 34 on front and rear sides of the main body 32, and a tip 35. The wood floor nails 3 are generally placed in a magazine clip attached to a pneumatically or electrically powered nail gun. The nails 3 are readily inserted into wood floor boards, with the main head 30 anchored to an outer surface of the wood floor board, but the nail 3 can not be easily removed. In the event that one has mistakenly inserted the nail 3, there is no easy means of removing the nail 3. Somehow the main head 30 must be grasped and pulled, causing damage to the delicate wood floor board, and the lateral extensions 34 that act to retain the nail 3 into the wood floor board and sub floor will destroy or at least significantly damage the wood floor board, as well as the sub floor when the nail 3 is pulled out. The lateral extensions 34 are not part of any helical screw thread and therefore, rotation of the nail 3 will not form a screw bore/helical thread bore that would permit the escape of the nail 3 out of the wood floor board and sub floor without significant damage to the wood material.

The wood floor staple 5 of FIG. 13 is also used to attach wood floor boards to a sub floor. The staple 5 includes a pair of legs 55 and a connector 52 connected to the legs 55. The staples 5 are usually placed in a magazine feed attached to a staple gun and the legs 55 are stapled into the wood floor board and sub floor, in a manner similar to the nail 1 shown in FIG. 11. The connector 55 rests on the wood floor board at a location similar to the main head 10 of the nail 1 in FIG. 11. The problem with the staple 52 is that the connector 52 tends to strongly impact the wood floor board, often shearing off pieces of the wood floor board on impact and thereby destroying the wood floor board. The use of a staple gun is not recommended when using brittle wood material or expensive materials, such as aged wood or the like. The staples 5 are easily dispensed but in addition to the disadvantage mentioned above, the staples 5 can not be readily or easily removed. If the staple 5 is applied incorrectly, the connector 52 must somehow be grasped and pulled to try to remove the staple. This is a highly time-consuming process which may lead to irreparable damage to the wood floor board.

Ordinary screws (not shown), such as wood screws, have a helical thread that spirals from at or near the piercing tip towards the head portion along its longitudinal length around a main body or shaft, as in the wood screw of U.S. Pat. No. 4,572,720. Such screws generally have a tool receiving slot for receiving a retracting tool such as a Phillips head screw head, Allen wrench, or the like, and are attached to a material by using a power tool that rotates the retracting tool which has been inserted into the tool receiving slot of the screw head. A helical threaded bore is formed in the material when the screw is inserted via rotation thereof. Such procedure also enables the screw to be retracted (via counter-rotation, leaving behind the helically threaded bore) without any significant damage to the material such as a wood floor, but the insertion by screw rotation of individual screws is highly time-consuming and labor-intensive, which significantly adds to overall building costs, i.e. laying wood flooring.

Furthermore when ordinary wood screw is driven into a wooden board, it is known that the wood shavings fill the grooves formed between adjacent screw thread sections on the shank portion as the screw threads cuts into the fibers of the wooden board, thereby resulting in a binding force between the screw and the wooden board. However, because the cutting line is in the form of a smooth spiral line, the cutting effect of the screw thread becomes duller as the cutting effect of the screw thread becomes duller as the depth of penetration of the conventional wood screw into the wood board increases. In addition, the increased resistance can have adverse affect on the required screw driving force and can result in possible damage to the screw.

Therefore, there is a need for an attachment device that can be quickly and easily be inserted into wood material or similar materials (i.e. via a nail gun), but which can be removed without significantly damaging or destroying the material while maintaining the integrity of the helically threaded portion of the device.

SUMMARY OF THE INVENTION

Accordingly, it is an object of the present invention to provide a retractable attachment device which can be easily and quickly attached to wood material or the like, and yet is able to be removed without significantly damaging or destroying the material.

Another object of the invention is to provide a retractable attachment device for attaching wood floor boards to the sub floor when laying wood flooring, such device including a breakaway portion that breaks off the device when the device is retracted by rotation along its longitudinal length.

Another object of the invention is to provide a retractable attachment device with a helically threads covered or filled with a plastic material, epoxy, glue, composite or the like to prevent damage to helically threaded portion of the device when the device is hammered or bored with a pneumatically or electrically powered nail gun to solid material.

Yet another object of the invention is to provide a retractable nail device having a main body having sides formed by front, rear and two lateral sides, with the front and rear sides thereof having rows of partial thread sections, and the lateral sides with missing thread sections, such that after the retractable nail device is nailed into a material, and the nail device can be rotated around the longitudinal axis of the main body, causing a helically threaded bore to be formed as the retractable nail is screwed out of the material, just as a helically threaded wood screw creates such a bore when it is inserted or removed (via rotation) from a block of wood.

Other objects and further scope of applicability of the present invention will become apparent from the detailed description given hereafter. It should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

The present invention will become more fully understood from the detailed description given below and the accompanying drawings are given by way of illustration only and thus are not limitative of the present invention, and wherein:

FIG. 1 is a side view of the retractable nail of the present invention.

FIG. 2 is a top plan view of the retractable nail of present invention.

FIG. 3 is a cutaway view of the retractable nail of the present invention along line 3-3 of FIG. 1.

FIG. 4 is a front view of the retractable nail of present invention.

FIG. 5 is a rear view of the retractable nail of present invention.

FIG. 6 is a side view of an embodiment of the present invention.

FIG. 7 is a top plan view of an embodiment of the present invention.

FIG. 8 is a cutaway view of an view of an embodiment of the present invention along line 8-8 of FIG. 6.

FIGS. 8A-8D are cutaway views similar to FIG. 8 of various alternative embodiments of the present invention.

FIG. 9 is a front view of an embodiment of the present invention.

FIG. 10 is a rear view of an embodiment of the present invention.

FIG. 11 illustrates the device of FIG. 1 in one application.

FIG. 12 is a prior art nail device.

FIG. 13 is a prior art staple device.

DETAILED DESCRIPTION OF THE PREFERRED EMBODIMENTS

For the purposes of illustrating the preferred embodiments of present invention, the drawings will be described in greater detail. FIGS. 1-4 illustrate one embodiment of the present invention. This embodiment is directed to a retractable attachment device, referred to as a retractable nail 1. The retractable nail 1 is preferably made of metal or alloy, but it is envisioned that it can be made of plastic or composite or any suitable, durable material. The retractable nail 1 is suitable for attaching a wood floor board 300 to a sub floor 500, when laying wood flooring, as shown in FIG. 11. The joist 600 is shown supporting the sub floor 500.

The retractable nail 1 combines the best advantages of standard nails and screws having a helical thread along its longitudinal surface, such as a wood screw. The retractable nail 1 includes a main head 10 connected to a main body 16. The embodiment further includes a secondary head 12 connected to the main head 10 with a narrow neck 14 positioned there between as illustrated in FIGS. 1 and 4. The secondary head 12 is configured to break off when the retractable nail 1 is rotated in the counter clockwise direction of the arrows in FIG. 3 or in a clockwise direction, after the retractable nail 1 is inserted to the wood floor board 300 and the sub floor 500.

The main body 16 stretches along its longitudinal length from the main head 10 and ends at the piercing tip 17. The main body 16 includes four sides when viewed from the cutaway view of FIG. 3, wherein front and rear sides (represented by FIGS. 9 and 10) are separated by two lateral sides (represented by FIG. 6). The front and rear sides include partial thread sections 18, 19 separated by the main body 16. The sides of the main body 160, 162 are shown as being substantially planar, but can have various non-planar shapes, as in FIGS. 8A-SD, including but not limited to any combination of concave, convex, oval, and circular shapes or the like, depending on the material properties of the wood flooring boards into which the retractable nails 1 are to be inserted.

One way of viewing the retractable nail 1 is as a modification of standard wood screw having a head connected to a shaft having a piercing point, with a helical thread extending from the piercing point, spiraling around the outer surface of the shaft towards the direction of the head; wherein cutouts are made substantially along the longitudinal length of the shaft to remove portions of the helical thread and preferably the shaft as well, resulting in a device having a cutout view of FIG. 3 or FIGS. 8A-D or the like, or a blade-like shape.

Thus partial thread sections 18 and 19 correspond to each other, such that when the retractable nail 1 is rotated out of a wood material or the like, including composite materials, a helical bore similar or identical to that which can be created by a wood screw will be formed in the material. The retractable nail 1 has a blade-like shape due to the elongated shapes of the main body 16 with lateral sides thereof missing thread sections, and the elongated shapes of the main head 10 and secondary head 12, and therefore can be easily inserted into wood floor boards or the like, when dispensed from a nail gun. The partial thread portions 18 and 19 will cause some initial resistance against insertion into the wood floor board 300 or the like, however such resistance is substantially reduced (in comparison to a standard wood screw) due to the narrow width (y) between the front and rear sides of the main body 16, as shown in FIGS. 3-5. The width between the sides 160, 162 (x) is preferably substantially larger than the width (y) between the front and rear sides 18, 19 of the main body 16, so that a blade-like cross-section is formed for easy insertion of the retractable nail 1. Further, the partial thread sections 18, 19 should be strong enough to resist substantial deformation during insertion (hammering) into the wood material or the like.

The secondary head 12 includes a lower portion 121 which is inserted (hammered) along with the main head 10 into the wood floor board 300 in the manner shown in FIG. 11. The secondary head 12 connected to the man head 10 via the neck 14 acts to anchor the retractable nail 1 to prevent the rotation of the retractable nail 1 in the direction or reverse of the arrows of FIG. 3 by rotative forces exerted on the retractable nail 1 in such active areas as a wood floor.

After the retractable nail 1 is inserted into wood floor boards 300 or the like (as in FIG. 11), the nail 1 can be removed by inserting a removal tool, such as a key, into the narrow slot 102 and the removal tool is preferably power rotated in a counter clockwise direction, as in the direction of the arrows of FIG. 3. When this occurs, the secondary head 12 which was embedded into the wood floor board 300, will break off at the narrow neck 14 and separate from the main head 10, and as the main body 10 is rotated, the partial thread portions 18 and 19 cut into the wood floor board 300 and form a helical thread bore in the wood floor board 300 and the sub floor 500, just as an ordinary wood screw would when inserted or removed from a block of wood via rotation, thereby permitting the removal of the retractable nail 1 without seriously damaging, destroying or shearing off pieces of the delicate wood floor board 300.

In contrast, the lateral extensions 34 of the prior art wood floor nail 3 of FIG. 12 are not partial helical thread sections and thus even if the main body 32 were rotated in a manner similar to that of the retractable nail 1, no helical thread bore will form and the wood floor nail 3 can not be removed from a wood floor board without splitting off portions of the wood floor board and thus destroying the wood floor board to which it is attached to, since the lateral extensions 34 will destroy the wood floor board upon removal.

Since it is not possible to remove the prior art wood floor nail 3 by such rotation, there are no need for any equivalent to the slot 102 of the invention for receiving a removal tool in the prior art wood floor nail 3. The striking faces of the main head 10 and the secondary head 12 are preferably oval in shape, as shown in FIGS. 1, 2 and 4, to facilitate easy insertion into the wood floor board, as well as provide resistance so that the main head 10 and the secondary head 12 remain close to the upper surface of the wood floor board 300, as in FIG. 11.

The retractable nail 1 permits the correction of mistakes during the wood floor laying process, saving costs for labor and material, without sacrificing efficiency in labor or material costs. The retractable nails 1 can be easily inserted (nailed) into wood materials or the like and yet can be removed without destroying or significantly damaging the material. It is noted that there many different types of wood floor boards, based on their material qualities, i.e. hard or soft wood. Depending on the properties of the wood floor boards used, the retractable nail 1 may require various cross-sectional views other than that of FIG. 3, such as shown in FIGS. 8A-8D.

The main head 10 and the secondary head 12 include striking faces 100 and 120 respectively, as shown in FIG. 2. The striking faces 100, 120 are shown to be flat and it is generally so preferred although other shapes including an oval shape may work as well.

A removal device in the form of a slot 102 of the main head 10 is preferably shaped to be rectangular or slit-shaped, as shown in FIGS. 1 and 2, to minimize its profile, so that the shape of the main head 10 can be minimized to form an oval shape in contrast to a circle shape of most standard nails and screws. A removal tool in the form of a male tool or key can lock into the slot 102 and rotated so that the nail 1 can be unscrewed from attachment to wood material or the like. Alternatively, the removal device may replace the slot 102 with a protrusion (not shown) so that the nail 1 can be removed by a female removal tool.

FIGS. 6-10 illustrate another embodiment of the present invention. The retractable nail 2 of this embodiment is similar to that of the retractable nail 1 of FIGS. 1-5, absent the secondary head 12 and breakaway neck 14. Further the shape of the head 20 of the retractable nail 2 does not have to be of a narrow or elongated or oval shape as in the previous embodiment, but can be configured as a circular shape much like that of a standard screw, as illustrated in FIGS. 6, 7, 9 and 10.

The retractable nail 2 is for general usage, not specific to i.e. application for a nailing wood floor boards. The retractable nail 2 can be used as a substitute for a standard nail or a screw having a helical thread as discussed above. The main head 20 of the retractable nail 2 can accommodate a variety of differing slots 202 into which a removal tool can be inserted and rotated to remove, release or tighten the retractable nail 2 in position in the material it is inserted (nailed) into, preferably by a nail gun as previously discussed with regard to the retractable nail 1. The slot 202 is shown as having a rectangular periphery in FIG. 7, however various other shapes of slots such as one that can receive a Phillips head screw attachment or Allen wrench attachment or the like can be configured on the main head 20.

The retractable nail 2 includes a main body 26 and a piercing tip 27. FIGS. 6-10 are similar to the view of FIGS. 1-5 of the retractable nail 1. The retractable nail 2 operates in a manner similar to the retractable nail 1. The retractable nails 2 are nailed into place using a hammer or a powered nail gun, just as ordinary nails. The striking face 200 may be flush with an outer surface of the material to which the retractable nail is secured to.

The main body 26 has a front side (FIG. 9), rear side (FIG. 10) and two lateral sides (FIG. 6), as shown in FIG. 8. The front and rear sides include rows of segments of a helical thread 28, 28A, 29 as illustrated in FIGS. 6 and 8-10. It is noted that the length between the front and rear sides (xx), shown in FIG. 8, is greater than the width (yy) between the front and rear sides, as shown in FIG. 9, of the main body 26. It is further noted that 28A is protective material such as a plastic material, epoxy, glue, composite or the like that is filled or covered into the helical threads to prevent damage to the helical threads when the device is hammered or bored with a pneumatically or electrically powered nail gun into a solid, fibrous or cellular materials or the like. In particular, the protective material 28A of FIG. 6 is filled or covered to at least closely match the width between 8-8 of FIG. 6. As an added benefit, it has been found that when the device is gunned into the wooden surface, the resistance/heat created between the device entering the wooden surface has melted the protective material and thereby leaving the helical threads undamaged and dulled. Hence, when the device needs to be retracted, the undamaged or dulled helical threads grips into the material to be removed from the material without destroying or significantly damaging the material.

As previously discussed the alternative embodiments of FIGS. 8A-8D illustrate various potential shapes for the main body 26, having various combinations of oval or circular cross sections, as well as concave and convex cross-sections. For instance, FIG. 8A shows two substantially convex sides 260, 262 for the main body 26. FIG. 8B shows a convex and concave side 260, 262. FIG. 8C shows the main body 26, but it could have an oval or elliptical cross-section. FIG. 8D shows an alternative shape for the helical thread segments 28, 28A, and 29, with a radial-shaped cutting edge 264, as well as a smaller cross-section of the main body 26 in comparison to that of FIG. 8C.

The combination of the various shapes for the cross-section of the man body 26 as well as that of the thread segments 28, 28A, 29, is to be adapted for a variety of applications, depending on the type of material the retractable nail 2 is to be used.

The retractable nail 2 functions similar to the retractable nail 1. Since the retractable nail 2 lacks the secondary head 20 and breakaway neck of the retractable nail 1, the retractable nail 2 can be used to tighten or loosen or remove the nail 2 in a material such as wood in the same manner as an ordinary screw with a Phillips head.

After the retractable nail has been hammered into place like an ordinary nail, if one desires to tighten the retractable nail 2 in place or remove the nail 2, a removal tool, such as a key, is inserted into the slot 202 and the removal tool is rotated in the clockwise or counterclockwise direction of the arrows of FIG. 8, thus causing the front and rear helical thread sections 28, 28A, 29 to cut into the material such as wood and form a partial or full helically threaded bore to facilitate in the tightening or loosening or removal of the retractable nail, similar to the operation of an ordinary wood screw having a helical outer thread. The width (xx) between the sides 260 and 262 is substantially larger than the width (yy) between the front and rear sides 28, 29 of the main body 26 so that a blade-shaped cross-section is formed as in FIG. 8 for easy insertion (hammering) of the nail 2.

Hence the retractable nail 2 of the present invention combines the best features of ordinary nails and screws, in that the retractable nail 2 is quickly and easily hammered into place and yet can be tightened, loosened or removed just like an ordinary wood screw (via rotation), leaving in place a partial or full helically threaded bore.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

The invention claimed is:

1. A retractable nail for attaching a solid, fibrous or cellular material, which can be retracted without seriously destroying or damaging said material, said nail comprising:
    a head portion comprising an elongated shape main head, the main head comprises a striking face and a slot configured for receiving a removal tool;
    a secondary head attached to the main head, the secondary head breaks away from said main head when said removal tool is actuated;
    a piercing part; and
    a longitudinal main body comprising a front and rear sides with a helical thread along its longitudinal surface and two lateral sides substantially planar without said helical thread;
    wherein a first width between said lateral sides is preferably larger than a second width between said front and rear sides; and
    wherein gaps between said helical threads are substantially filled with a protective material to prevent damage to said helical threads when said nail is hammered or bored pneumatically or electrically powered into said solid, fibrous or cellular material.

2. The retractable nail as claimed in claim 1, wherein said main head comprises a substantially circular outline.

3. The retractable nail as claimed in claim 1, wherein said main head comprises a substantially oval periphery.

4. The retractable nail as claimed in claim 1, wherein said main head comprises a slot having a substantially rectangular outline.

5. The retractable nail as claimed in claim 1, wherein a lateral cross-section of the main body comprises a side having at least one of a convex, concave, elliptical, circular and planar shapes.

6. The retractable nail as claimed in claim 1, wherein at least one of said helical threads on said front and rear side comprises a substantially radial cutting edge.

7. The retractable nail as claimed in claim 1, wherein said protective material comprises any of a plastic material, epoxy, glue, or composite.

* * * * *